US012812734B2

(12) United States Patent
Heintz et al.

(10) Patent No.: US 12,812,734 B2
(45) Date of Patent: Nov. 24, 2026

(54) TRANSPARENT CNT HEATERS FOR LAMINATED GLASS

(71) Applicant: Battelle Memorial Institute, Columbus, OH (US)

(72) Inventors: Amy Heintz, Dublin, OH (US); Katherine M. Palmer, Columbus, OH (US); Kurt Bosworth, Woodstock, OH (US); Anthony D. Duong, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 750 days.

(21) Appl. No.: 18/020,696

(22) PCT Filed: Aug. 13, 2021

(86) PCT No.: PCT/US2021/046028
§ 371 (c)(1),
(2) Date: Feb. 10, 2023

(87) PCT Pub. No.: WO2022/036274
PCT Pub. Date: Feb. 17, 2022

(65) Prior Publication Data

US 2023/0269833 A1 Aug. 24, 2023

Related U.S. Application Data

(60) Provisional application No. 63/065,466, filed on Aug. 13, 2020.

(51) Int. Cl.
*H05B 3/00* (2006.01)
*B32B 17/10* (2006.01)
(Continued)

(52) U.S. Cl.
CPC ....... *H05B 3/145* (2013.01); *B32B 17/10165* (2013.01); *B32B 37/003* (2013.01);
(Continued)

(58) Field of Classification Search
CPC .......... H05B 2214/04; H05B 2203/017; H05B 2203/013; H05B 3/84; H05B 3/34;
(Continued)

(56) References Cited

U.S. PATENT DOCUMENTS 6,136,412 A * 10/2000 Spiewak ............... H01M 4/881 428/524
6,335,112 B1 * 1/2002 Asukabe ............. H01M 8/1051 429/535
(Continued)

FOREIGN PATENT DOCUMENTS

EP 2218081 B1 7/2015

OTHER PUBLICATIONS

Computer English translation of JP 6726576 (Year: 2020).*
(Continued)

*Primary Examiner* — Erin B Saad
(74) *Attorney, Agent, or Firm* — Susanne A. Wilson; Frank Rosenberg

(57) ABSTRACT

A CNT heater is described comprising, in sequence, a first substrate, an adhesive layer, a protective layer, a CNT network layer, and a second substrate. Resistive heating is generated when a current passes through the CNT layer. The system has been found to provide improved stability and stability.

15 Claims, 4 Drawing Sheets

(51) Int. Cl.

| | |
|---|---|
| ***B32B 37/00*** | (2006.01) |
| ***B32B 37/12*** | (2006.01) |
| ***H05B 3/14*** | (2006.01) |
| ***H05B 3/86*** | (2006.01) |
| *F03D 80/40* | (2016.01) |

(52) U.S. Cl.

CPC ............... *B32B 37/12* (2013.01); *H05B 3/86* (2013.01); *B32B 2307/202* (2013.01); *B32B 2307/412* (2013.01); *B32B 2457/00* (2013.01); *F03D 80/40* (2016.05); *H05B 2203/017* (2013.01)

(58) Field of Classification Search

CPC ................ H05B 3/86; H05B 2203/005; H05B 2203/007; H05B 2203/011; H05B 2203/014; H05B 2203/032; H05B 2214/00; H05B 2214/03; B32B 2307/412; B32B 17/10036

See application file for complete search history.

(56) References Cited

U.S. PATENT DOCUMENTS 6,683,783 B1 1/2004 Smalley et al.
6,686,308 B2 * 2/2004 Mao ...................... H01M 4/926 502/185
7,098,163 B2 * 8/2006 Hampden-Smith ......................... H01M 4/8842 429/479
7,211,344 B2 * 5/2007 Bae ..................... H01M 8/0662 429/444
7,241,528 B2 * 7/2007 Sudo ..................... H01M 4/881 429/535
8,247,136 B2 * 8/2012 Yan ..................... H01M 8/1004 427/115
8,426,776 B2 4/2013 Wang et al.
11,648,751 B2 * 5/2023 Losot ....................... B60J 1/006 428/137
2004/0167014 A1 * 8/2004 Yan ..................... H01M 4/8875 502/101
2004/0197638 A1 * 10/2004 McElrath ............ H01M 4/8652 977/843
2009/0321418 A1 * 12/2009 Feng ........................ H05B 3/28 219/546
2010/0126981 A1 * 5/2010 Heintz .................. C08F 291/00 977/734
2010/0237055 A1 * 9/2010 Rousseau .......... B32B 17/10743 156/99
2012/0138589 A1 * 6/2012 Mitchell .................. C09D 7/62 219/202
2017/0291580 A1 10/2017 Loganathan et al.
2020/0189229 A1 * 6/2020 Palmer ...................... B32B 5/18
2023/0045928 A1 * 2/2023 Risser ..................... B32B 9/041
2023/0223174 A1 * 7/2023 DeBerry .......... H01C 17/06506 338/22 R
2023/0269833 A1 * 8/2023 Heintz ..................... H05B 3/86 219/553

OTHER PUBLICATIONS

Hu, L. et al., "Percolation in Transparent and Conducting Carbon Nanotube Networks", Nano Lett., (2004) 4 (12), 2513-2517.
Itkis, M. E. et al., "Purity Evaluation of As-Prepared SingleWalled Carbon Nanotube Soot by Use of Solution-Phase Near-IR Spectroscopy," Nano Lett. 2003, 3(3), 309-314.
Yoon et al. "Transparent Film Heater Using Single-Walled Carbon Nanotubes," Advanced Materials, (2007) 19 (23), 4284-4287.
Moulton et al., "Liquid Crystal Behavior of Single-Walled Carbon Nanotubes Dispersed in Biological Hyaluronic Acid Solutions", J. Am. Chem. Soc., (2007) vol. 129, No. 30, 9452-9457.
Loganathan, "Windshield Defrost and Deice Using Carbon Nanotube Composite," Thesis, Embry-Riddle Aeronautical University, Dec. 2016.
Freiman et al. "Measurement Issues in Single Wall Carbon Nanotubes", NIST Special Publication 960-19, Mar. 2008.
International Preliminary Report on Patentability from International Application No. PCT/US2021/046028 dated Feb. 7, 2023.
International Search Report from International Application No. PCT/US2021/046028 Mailing Date Nov. 12, 2021.
Written Opinion of the International Search Authority from International Application No. PCT/US2021/046028 Mailing Date Nov. 12, 2021.

* cited by examiner

TRANSPARENT CNT HEATERS FOR LAMINATED GLASS

RELATED APPLICATIONS

This application claims the priority benefit of U.S. Patent Application Ser. No. 63/065,466, filed 13 Aug. 2020.

INTRODUCTION

Electric vehicles offer numerous advantages including better performance and reduced pollution; however, front windshield defrosters cannot be powered by a hot internal combustion engine. Thus, windshield defrosters powered by electrical resistance become an attractive option.

An early design for a transparent, conductive single-walled carbon nanotube (SWCNT) film heater as a defroster was described by Yoon et al. in "Transparent Film Heater Using Single-Walled Carbon Nanotubes," Advanced Materials, 19, 8284-4287 (2007). To make this heater, SWCNTs were dispersed in water and collected as a CNT network film on a filter and transferred to a glass or poly(ethylene terephthalate) substrate. Electrodes were then attached with silver paste.

More recently, a review of the relevant literature and testing of transparent, concluded CNTs resistive heaters prepared by either sandwiching a CNT layer between glass plates or protective spray coating methods, did not yield acceptable results when the heaters are exposed to environmental conditions. See Thesis of Loganathan, "Windshield Defrost and Deice Using Carbon Nanotube Composite," Embry-Riddle Aeronautical University, Dec. 2016. In this work, laminates were prepared by applying a 1 um thick acrylic coating over the CNTs prior to sandwiching between glass plates. Since this sandwiching method was found to result is unacceptably poor performance in environmental conditions, Loganathan applied a protective coating of an acrylic aerosol spray; this was also found to cause to substantial drop in performance and, over time, complete failure. Better results were obtained when the CNT film was protected with a thermal tape sold by 3M, which reduced hot spots. See also Loganathan, US Patent Publ. 2017/0291580.

A further description of CNT-based resistive heaters can be found in U.S. Pat. No. 8,426,776 by Wang et al. (entitled Carbon Nanotube Defrost Windows) which describes describes a structure having a transparent substrate (glass or the like); a CNT film; and an adhesive layer disposed between the substrate and the CNT film. Examples of the adhesive layer may be polymethyl methacrylate acrylic (PMMA) or polyvinyl chloride (PVC). A protective layer of PMMA, PVC, polycarbonate, PET, PES, benzocyclobutenes (BCB), polyesters, polyacrylic resins, or epoxy resin. No examples or results are provided. Other published patent applications have suggested the use of CNTs in resistive heaters; for example, Feng et al., US 2009/0321418, Elhard et al. in EP 2 218 081, and Rousseau et al., US 2010/0237055.

Despite these and other efforts, there remains a need for an improved CNT resistive heater that can be employed as a transparent, electrically-powered defroster.

SUMMARY OF THE INVENTION

The invention provides a transparent heater comprising a CNT resistive heater. The heater comprises, in sequence, a transparent substrate, an adhesive layer (preferably comprising PVB), a layer comprising a sulfonated tetrafluoroethylene based fluoropolymer-copolymer, a CNT network layer, and a transparent cover layer. The cover layer comprises a protective coating and/or a transparent substrate. Nafion™ is a sulfonated tetrafluoroethylene based fluoropolymer-copolymer. A conductor is electrically connected to the CNT network layer so that a current can be passed through the CNT layer during operation. The heater is typically also radio frequency (RF) transparent. The inventive heater may be, for example, advantageously applied to the front and/or side window of a vehicle, or a blade such as in a windmill or helicopter.

Alternatively (or in addition to the concept discussed above), the invention can be described as a defroster structure comprising a transparent structure, a protective interlayer, a CNT network layer, a transparent cover layer, and further defined by the % increase in resistance profile as shown in the figure (entitled % increase in Resistance over Time) or within ±10% or ±20% or ±50% or ±100% of the resistance as shown in the figure. This is determined by conducting the resistance testing as in the examples below. For example, an increase of 20% or 15% or 10% or less or between 3% and 20% after exposure to ambient conditions for 5 10, 14 or 20 days.

The invention also includes methods of making the heater and methods of using the heater to remove frost or ice. The invention may also be described as a method of improving the durability of a defroster comprising: adding the protective interlayer (preferably a sulfonated tetrafluoroethylene based fluoropolymer-copolymer such as Nafion™); and/or comprising (compared to the identical method without the protective interlayer) wherein there is at least 2 times or at least 5 times or at least 10 times less increase of conductivity (and optionally about the maximum improvement as shown in the figures below) when exposed to ambient conditions for 5, 10 or 14 days or 20 days, while substantially maintaining transparency and conductivity (less than 10% change in one or preferably both of these values, for example transparency at about 0.5 μm wavelength).

The CNT coating can be applied as a transparent conductor. The CNT layer can be applied by known methods including dip coating or more preferably spray coating. Spray-application of the coating to the polyvinylbutyrate (PVB) adhesive interlayer, prior to safety glass finishing, is far cheaper and scalable than a sputtering option. Electrodes can be connected to the CNT network layer by known methods, for example a silver paste disposed between metal (preferably copper) electrodes.

The invention is often characterized by the term "comprising" which means "including," and does not exclude additional components. For example, the phrase "a dispersion comprising CNTs and an anionic glycosaminoglycan or an anionic polysaccharide" does not exclude additional components and the dispersion may contain, for example, multiple types of glycosaminoglycan, or both glycosaminoglycan and polysaccharide, etc. In narrower aspects, the term "comprising" may be replaced by the more restrictive terms "consisting essentially of" or "consisting of." This is conventional patent terminology.

Glossary of Terms

"Ambient conditions" are 25° C. and 50% humidity.

The term "carbon nanotube" or "CNT" includes single, double and multiwall carbon nanotubes and, unless further specified, also includes bundles and other morphologies. The invention is not limited to specific types of CNTs. The CNTs can be any combination of these materials, for example, a CNT composition may include a mixture of single and multiwall CNTs, or it may consist essentially of DWNT and/or MWNT, or it may consist essentially of SWNT, etc. CNTs have an aspect ratio (length to diameter) of at least 50, preferably at least 100, and typically more than 1000. In some embodiments, a CNT network layer is continuous over a substrate; in some other embodiments, it is formed of rows of CNT networks separated by rows of polymer (such as CNTs deposited in a grooved polymer substrate). The CNTs may be made by methods known in the art such as arc discharge, CVD, laser ablation, or HiPco. The G/D ratio of CNTs is a well-known method for characterizing the quality of CNTs.

The optical absorbance spectrum of CNTs is characterized by S22 and S11 transitions, whose positions depend upon the structure distribution of the CNTs and can be determined by a Kataura plot. These two absorption bands are associated with electron transitions between pairs of van Hove singularities in semiconducting CNTs.

Carbon nanotubes can be defined by purity factors that include percentage of metallic impurities (usually catalytic residues such as Fe, Mo, Co, Mn, etc,) and percentage of non-carbon nanotube impurities, which can be characterized by methods known in the art such as thermogravimetic analysis. The chemistry of the impurities can be determined by methods such as SEM-EDS. It is preferable to use carbon materials that have high purity, as these often have better combination of high conductivity and corrosion stability. Less than 1 to 2% metallic impurities are preferred.

CNT coating solutions may contain glycosaminoglycans. Glycosaminoglycans are long unbranched polysaccharides consisting of a repeating disaccharide unit. The repeating unit (except for keratan) consists of an amino sugar (N-acetylglucosamine or N-acetylgalactosamine) along with a uronic sugar(glucuronic acid or iduronic acid) or galactose. Glycosaminoglycans are highly polar. Anionic glycosaminoglycans are characterized by having at some hydroxyl protons replaced by a counter ion; typically an alkali or alkaline earth element. Examples of glycosaminoglycans include: β-D-glucuronic acid, 2-O-sulfo-β-D-glucuronic acid, α-L-iduronic acid, 2-O-sulfo-α-L-iduronic acid, β-D-galactose, 6-O-sulfo-β-D-galactose, β-D-N-acetylgalactosamine, β-D-N-acetylgalactosamine-4-O-sulfate, β-D-N-acetylgalactosamine-6-O-sulfate, β-D-N-acetylgalactosamine-4-O, 6-O-sulfate, α-D-N-acetylglucosamine, α-D-N-sulfoglucosamine, and α-D-N-sulfoglucosamine-6-O-sulfate.

Polysaccharides are polymeric carbohydrate molecules composed of long chains of monosaccharide units bound together by glycosidic linkages and on hydrolysis give the constituent monosaccharides or oligosaccharides. Anionic polysaccharides are characterized by having at least some hydroxyl protons (the most labile hydroxyl protons are associated with carboxylic acid moieties) replaced by a counter ion; typically an alkali or alkaline earth element. Examples of anionic polysaccharides include natively anionic polysaccharide gums and natively non- or cationic polysaccharide gums being chemically modified to have an anionic net charge. Polysaccharide gums contemplated for use in the present invention include Agar, Alginic acid, Beta-glucan, Carrageenan, Chicle gum, Dammar gum, Gellan gum, Glucomannan, Guar gum, Gum arabic, Gum ghatti, Gum tragacanth, Karaya gum, Locust bean gum, Mastic gum, Psyllium seed husks, Sodium alginate, Spruce gum, Tara gum and Xanthan gum, the polysaccharide gums being chemically modified, if necessary, to have an anionic net charge.

Materials such as sodium hyaluronate are natural products. These may be isolated from animal sources or extracted from bacteria.

Carbon nanotubes (CNT) films prepared from aqueous paints can be stabilized against moisture damage by using hyaluronic acid (HA), sodium salt as the dispersing agent and performing a mild acid wash (pH~2.5) after film deposition. The mild acid wash changes the surface energy of the film and the solubility behavior of the film. After treatment, the film does not blister after longer term exposure to humidity. It is more readily wetted and coated by paints or other organics. The treatment does not remove the HA; thus the material can be reacted with a variety of reagents, such as electrophiles like isocyanates and isobutylene, creating hydrophobic and/or crosslinked films. Other anionic glycosaminoglycan or anionic polysaccharides could be used according to the methods of the present invention, although, in some embodiments, HA is the most preferred.

Sodium hyaluronate is the sodium salt of hyaluronic acid (HA). Hyaluron is a viscoelastic, anionic, nonsulfated glycosaminoglycan polymer. It is found naturally in connective, epithelial, and neural tissues. Its chemical structure and high molecular weight make it a good dispersing agent and film former. CNT/HA aqueous dispersion and phase diagram has been reported in the literature (Moulton et al. J. Am. Chem. Soc. 2007, 129(30), 9452). These dispersions may be used to create conductive films by casting the solution onto a substrate and allowing it to dry. However, the resulting films exhibit blistering, i.e. loss of adhesion, upon exposure to moisture or high humidity. In addition, they suffer from resistance fluctuations that occur as a result of moisture fluctuations, as HA can expand and contract, changing the junction resistance between CNT-CNT contacts.

"Fiberglass" refers to plastic reinforced with fibers. The fibers are typically glass fibers as individual or groups of fibers or fabrics; however, other fibers can also be used as reinforcement.

"Transparent" refers to a transparency of at least 80% or at least 90% or at least 95% throughout the visible spectrum or a transparency of at least 80% or at least 90% or at least 95% through at least 80% or at least 90% of the visible spectrum.

"Vacuum" refers to a reduced pressure in which gases are evacuated from a heating apparatus during a lamination step.

DETAILED DESCRIPTION OF THE INVENTION

Figure 1:
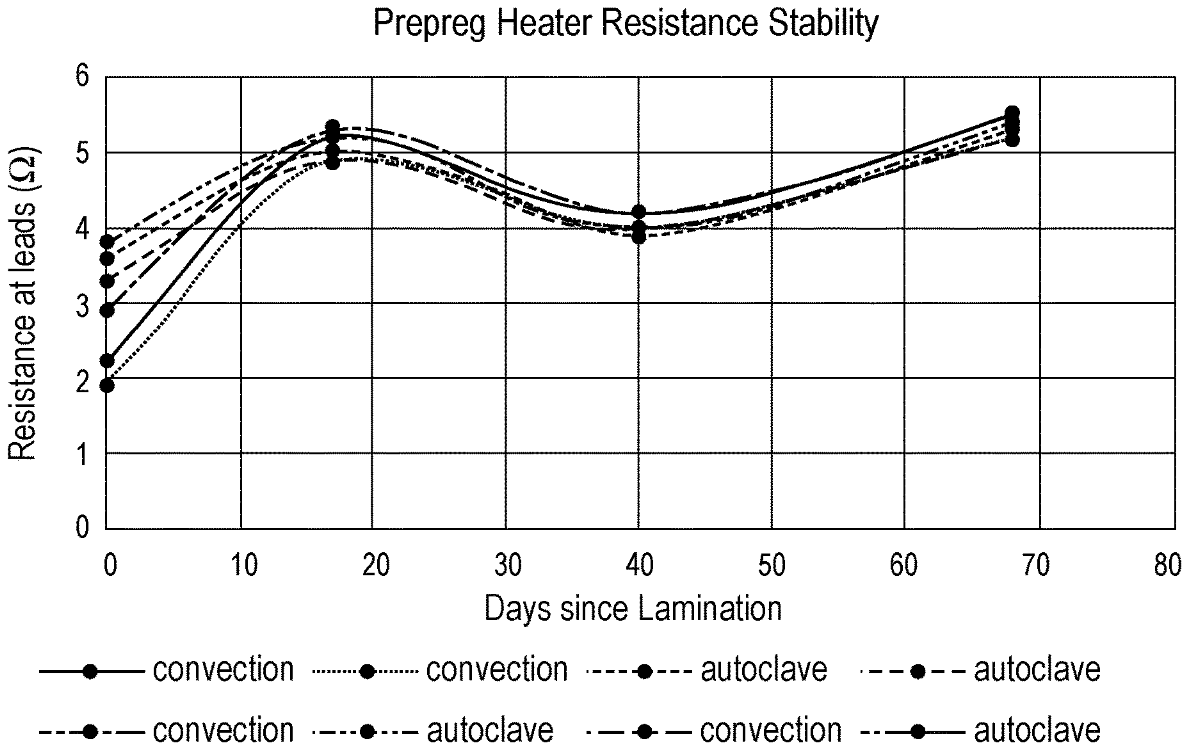
FIG. 1 shows resistance as a function of time for laminates bonded in a convection oven and in an autoclave with reduced pressure. The autoclaved samples (the three data points showing the highest initial resistivity) showed the smallest initial increase in resistivity while the ordinary convection oven samples (the three data points showing the lowest initial resistivity) showed a larger initial increase in resistivity.

CNT network layers of the present invention preferably contain at least 25 weight % CNT, in some embodiments at least 50 wt %, and in some embodiments 25 to 100 wt % CNT. The CNTs can be distinguished from other carbonaceous impurities using methods known to those skilled in the art, including NIR spectroscopy ("Purity Evaluation of As-Prepared Single-Walled Carbon Nanotube Soot by Use of Solution-Phase Near-IR Spectroscopy," M. E. Itkis, D. E. Perea, S. Niyogi, S. M. Rickard, M. A. Hamon, H. Hu, B. Zhao, and R. C. Haddon, Nano Lett. 2003, 3(3), 309) Raman, thermogravimetric analysis, or electron microscopy (Measurement Issues in Single Wall Carbon Nanotubes. NIST Special Publication 960-19). The CNT network layer (again, prior to coating) preferably has little or no polymer ("polymer" does not include CNTs or carbonaceous materials that typically accompany CNTs—typical examples of polymers include polyurethane, polycarbonate, polyethylene, etc.); preferably the network layer comprises less than 5 wt % polymer, more preferably less than 1 wt %) The volume fraction in the network layer is preferably at least 2% CNTs, more preferably at least 5%, and in some embodiments 2 to about 90%. The remainder of the composite may comprise air (by volume) and/or other materials such as residual surfactant, carbonaceous materials, or dispersing agent (by weight and/or volume). "Substantially without polymer" means 5 weight % or less of polymer in the interior of a CNT film, preferably the film has 2 weight % or less of polymer, and still more preferably 1 weight % or less of polymer in the interior of the CNT film. This is quite different from composite materials in which CNTs are dispersed in a polymer matrix.

After the CNT network layer has been coated, it retains electrical conductivity provided by contacts between CNTs; it is preferably not a dispersion of CNTs in a polymer matrix. Typically, a cross-sectional view of the composite material will show a polymer layer that contains little or preferably no CNTs and a CNT network layer that comprises CNTs (and possibly other carbonaceous materials that commonly accompany CNTs, as well as surfactants) with little or no polymer. Preferably, a CNT network layer that has an overlying polymer coating comprises 50 mass % or less of the coating polymer within the CNT layer, more preferably 25 mass % or less, and still more preferably 10 mass % or less of the coating polymer within the layer. Preferably, a CNT layer comprises at least 25 mass % CNTs and carbonaceous materials, and preferably at least 50 mass % CNTs and in some embodiments 30 to 100 mass % CNTs. CNT networks and CNT fibers have very distinct rope-like morphology as observed by high resolution SEM or TEM. See for example Hu, L.; Hecht, D. S.; and Gruner, G. Nano Lett., 4 (12), 2513-2517 for CNT networks and U.S. Pat. No. 6,683,783 for images of CNT fibers. Because the CNT layers typically contain little or no polymer, they exhibit surface roughness, if characterized by AFM, associated with the CNT diameter and bundle size, in the range of 0.5 to 50 nm. Preferably, the coating composition contacts the surface of the CNT network layer but does not fill spaces within the network layer. Penetration of a coating into the CNT layer could also be determined by crosssection of the multi-layer sample and then analysis by methods such as SEM-EDS or XPS; the CNT layer is preferably substantially free from N-groups that are associated with the topcoat.

CNT layers have many contacts between CNTs and good conductivity that is, a resistivity less than 0.05 Ω·cm, preferably less than 0.002 Ω·cm. The sheet resistance of this layer should be less than 500 Ω/square, preferably less than 200 Ω/square, more preferably less than 50 Ω/square. The CNT layer is preferably substantially planar (similar to a sheet of paper or a nonwoven textile sheet, a few fibers may project from a planar layer). These are preferred characteristics of the CNT layer both before and after a glass sheet is applied over the CNT layer.

A CNT network in this invention can be prepared as a dispersion of CNTs applied directly to a substrate where the solvents used in the dispersion process are evaporated off leaving a layer of CNTs that coagulate together into a continuous network. The CNT network may be prepared from dispersions and applied by coating methods known in the art, such as, but not limited to, spraying (air assisted airless, airless or air), roll-coating, gravure printing, flexography, brush applied and spin-coating. The thickness of the CNT layer is preferably in the range from 0.005 μm to 300 μm, preferably in the range of 0.05 μm to 100 μm, more preferably in the range of 0.3 μm to 100 μm.

The thickness of a protective layer disposed between a CNT layer and an adhesive layer can be, for example, in the range from 0.05 μm to 1000 μm, preferably in the range of 0.5 μm to 500 μm, or in the range of 0.3 μm to 100 μm. The thickness of an adhesive layer in the laminate can be, for example, in the range from 0.1 μm to 1000 μm, preferably in the range of 0.5 μm to 600 μm, or in the range of 1 μm to 400 μm. The length of a CNT network layer between electrodes is preferably at least 5 cm, or at least 10 cm, or at least 20 cm, or at least 30 cm, or, in some embodiments, in the range of 5 to 100 cm. As is conventional, distances refer to average distances unless specified otherwise.

The CNT layer may include other optional additives such as p-dopants. P-dopants could include, but are not limited to, perfluorosulfonic acids, thionyl chloride, organic pi-acids, nitrobenzene, organometallic Lewis acids, organic Lewis acids, or Bronsted acids. Materials that function as both dispersing agents and dopants such as Nafion and hyaluronic acid may be present. These materials contain p-doping moieties, i.e., electron accepting groups, within their structure, often as pendant groups on a backbone. Generally, these additives will be present as less than 70% by weight of the CNT film, and in some embodiments as less than 50% by weight of the CNT film. Polymers and carbohydrates that function as both dispersing agents and dopants can be distinguished from other polymer materials, i.e. those functioning as only a dispersing agent or those functioning as a structural component. Because of the presence of electron accepting moieties, these materials can form a charge transfer complex with semiconducting CNTs, which p-dopes the semiconducting CNTs and raises the electrical conductivity. Thus, these dual dispersing agent/dopants can be tolerated at a higher mass percentage within the CNT layer than other types of polymer materials or surfactants. In some embodiments, the CNT layer contains no or essentially no dopants.

The invention also includes methods for anti-icing, deicing, and/or a heating system using the laminates described herein.

EXAMPLES

Example #1—Prepreg Glass

E glass prepreg 7781 material from Fibreglast was cut into 4"×4" panels. One of the panels was placed onto non-stick aluminum foil. Two 6" lengths of Hex Wik W55 copper braid was dipped into uncured Epoxy-Tek EJ2189 silver epoxy and placed on the prepreg glass panel 3" apart to create two busbars on opposing sides of the heater area. The coated HexWik busbars were each covered with thin silicone films and allowed to cure at room temperature for 16 hours. A 3"×3" area between the busbars was masked off and coated by spray application with SWCNT dispersion with 3-4 coats until a resistance of about 2 ohms per square was reached using a 4 point probe. The coated panel was allowed to air dry at room temperature for 16 hours. A second 4"×4" prepreg 7781 glass panel from Fibreglast was placed over the coated panel. Eight total panels were prepared. Four panels were cured in an autoclave at 300° F. for 1 hour and the other four were cured in a convection oven at 300° F. for 1 hour. The translucent samples were tested for resistance at the busbars for 68 days. The data is shown in FIG. 1.

Example #2—Clear Borosilicate Glass

Borosilicate glass panels size 4"×4"×1/16" are cleaned with water and Dawn detergent, rinsed with water then rinsed with isopropyl alcohol then allowed to air dry. A 3"×3" area is masked off with scotch tape on one of the panels. A #8 wire wound bar is used to drawn down a thin coating of SWCNT dispersion at 20.5 microns applied thickness. The CNT coating is allowed to air dry (about 30 minutes in ambient air) then the scotch tape mask is removed. A Nafion coating was brush applied manually over the CNT area leaving the edges exposed to allow the silver epoxy to be applied any still make contact with the CNT layer. The Nafion was allowed to air dry for a few minutes before the silver epoxy was applied.

Figure 2:
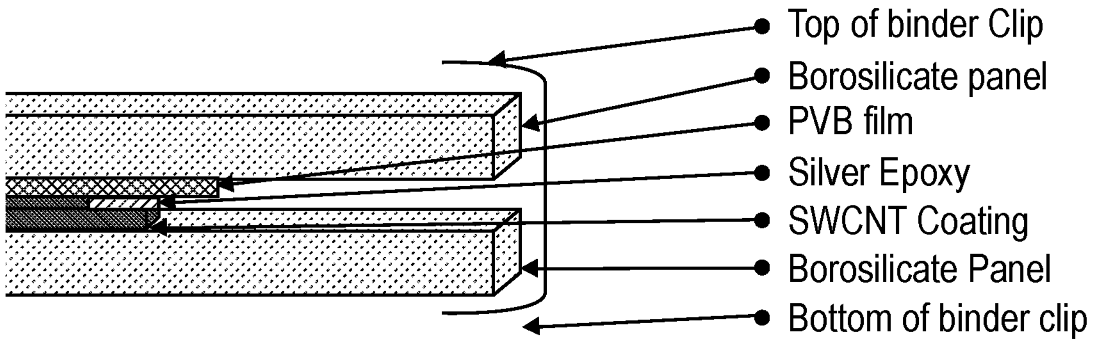
FIG. 2 is a schematic cross-sectional view of a transparent laminate before bonding.

Two busbars of silver filled epoxy resin (Epo-Tek® EJ2189-LV) are brush applied onto two opposing sides of the of the CNT square and extending to one edge of the glass panel. The silver epoxy will provide electrical contact to power the heater. While the silver epoxy is still liquid and before it cures, one film sheet (3.5"×3.5") of the PVB film was applied over the heater area. The second glass panel was placed over the PVB film (Trosifol BGR15 0.38 mm thick) and the entire assembly is secured on the edges with binder clips. See FIG. 2.

The assembly was placed in a vacuum oven pre-heated to 170° C. Vacuum was pulled to 24 inch Hg for 60 minutes, then the vacuum was removed and the assembly remained in the oven for an additional 5 minutes. The glass laminate assembly was removed from the oven and allowed to cool to room temperature.

Applying the CNT as transparent conductor to the glass provided better visual appearance than applying to the polyvinyl butyral (PVB). The PVB films are textured and the CNT tends to pool in the divots creating a non-uniform heater both visually and electrically. Testing was performed with 2 different PVB interlayer films typically used for laminating automotive windshields:

Saflex RA41 (0.80 mm thick) from Eastman

Trosifol BG-R15 (0.38 mm thick, PVB) from Kuraray

Figure 3:
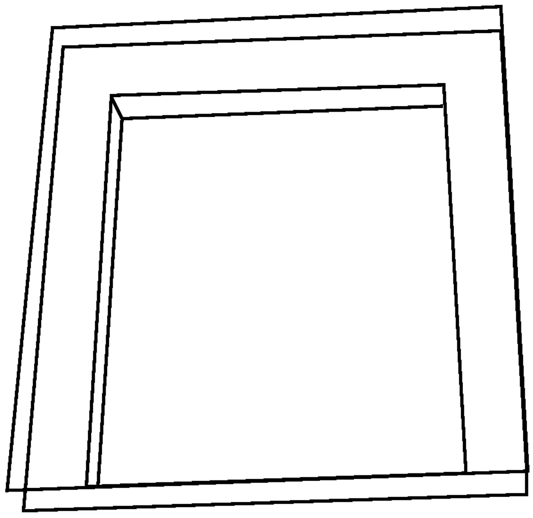
FIG. 3 is a photograph of the transparent panel resulting from hot pressing the transparent laminate.

Can apply CNT network layer to either films or glass. Resistance increased from 45-50Ω to about 150-220Ω after lamination. Processing parameters (temp, time and vacuum) were controlled to minimize air entrapment without disrupting CNT layer. An image of the film applied to the transparent substrate is shown in FIG. 3.

Figure 4:
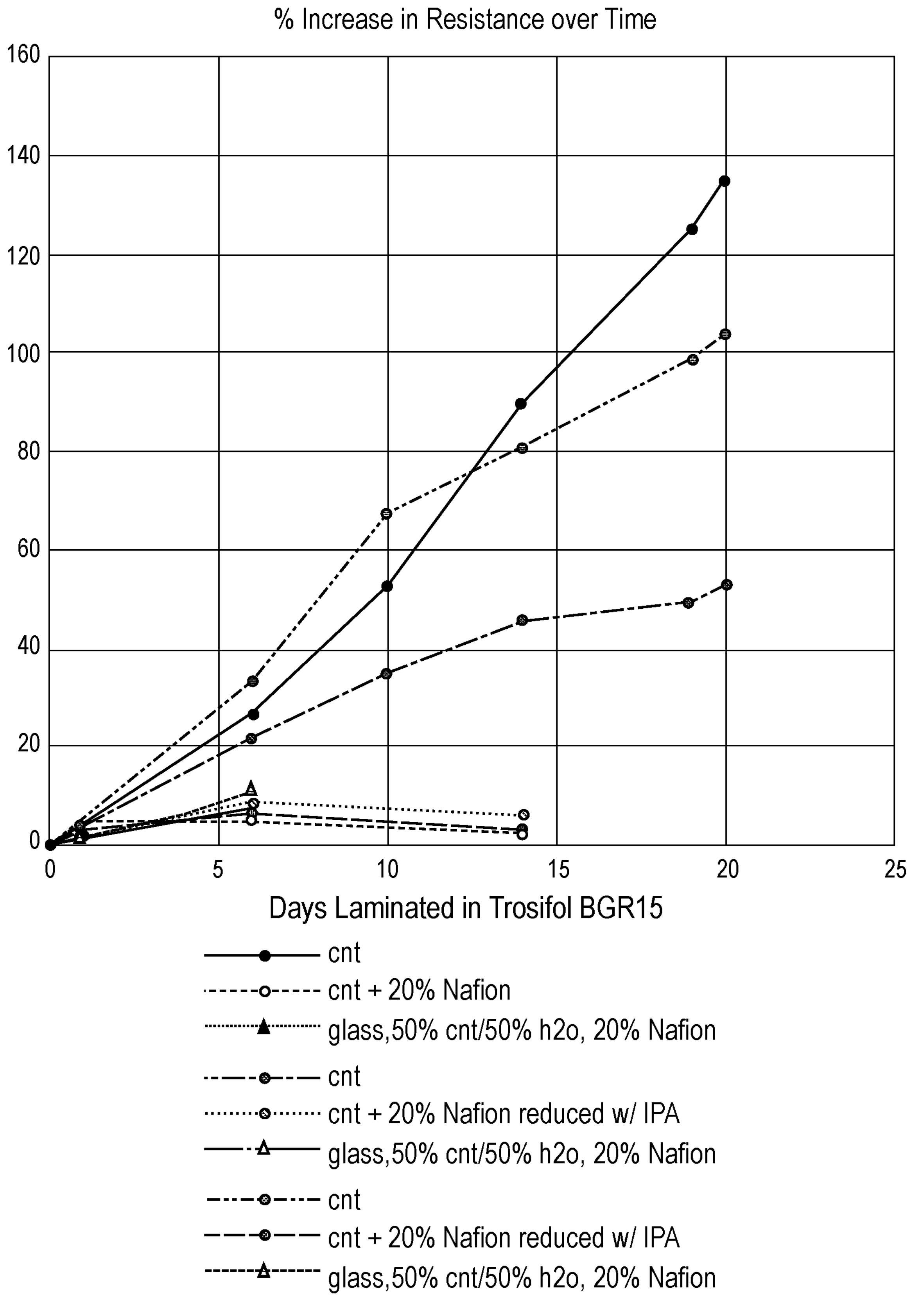
FIG. 4 is a plot of resistance versus time for panels prepared without a Nafion protective layer (the three samples showing a large increase in resistivity over time) and panels with a Nafion protective layer disposed between the CNT network layer and the PVB layer.

Good results for both prepreg and glass laminate substrate show reasonable thermal performance even after a cure cycle. No significant drift in resistance over time was observed with prepreg samples. As shown in FIG. 4, resistance increased significantly over time in glass laminate samples; however, application of a Nafion (a sulfonated tetrafluoroethylene based fluoropolymer-copolymer) protective barrier coating resulted in a highly stable laminate.

A thermal image of a glass sample at 167 Ω heating using 20 volts, 0.12 amps showed uniform heating over the panel with a temperature between 85 and 90 F.

Prepared glass laminate samples were heated in a vacuum oven. In some cases, the silver epoxy was observed to cure hard before full flow out of the PVB film preventing air escape. It is believed that glass treatment to improve flow or higher laminating temperature may reduce/eliminate this problem.

Example 3, Flexibility

Figure 5:
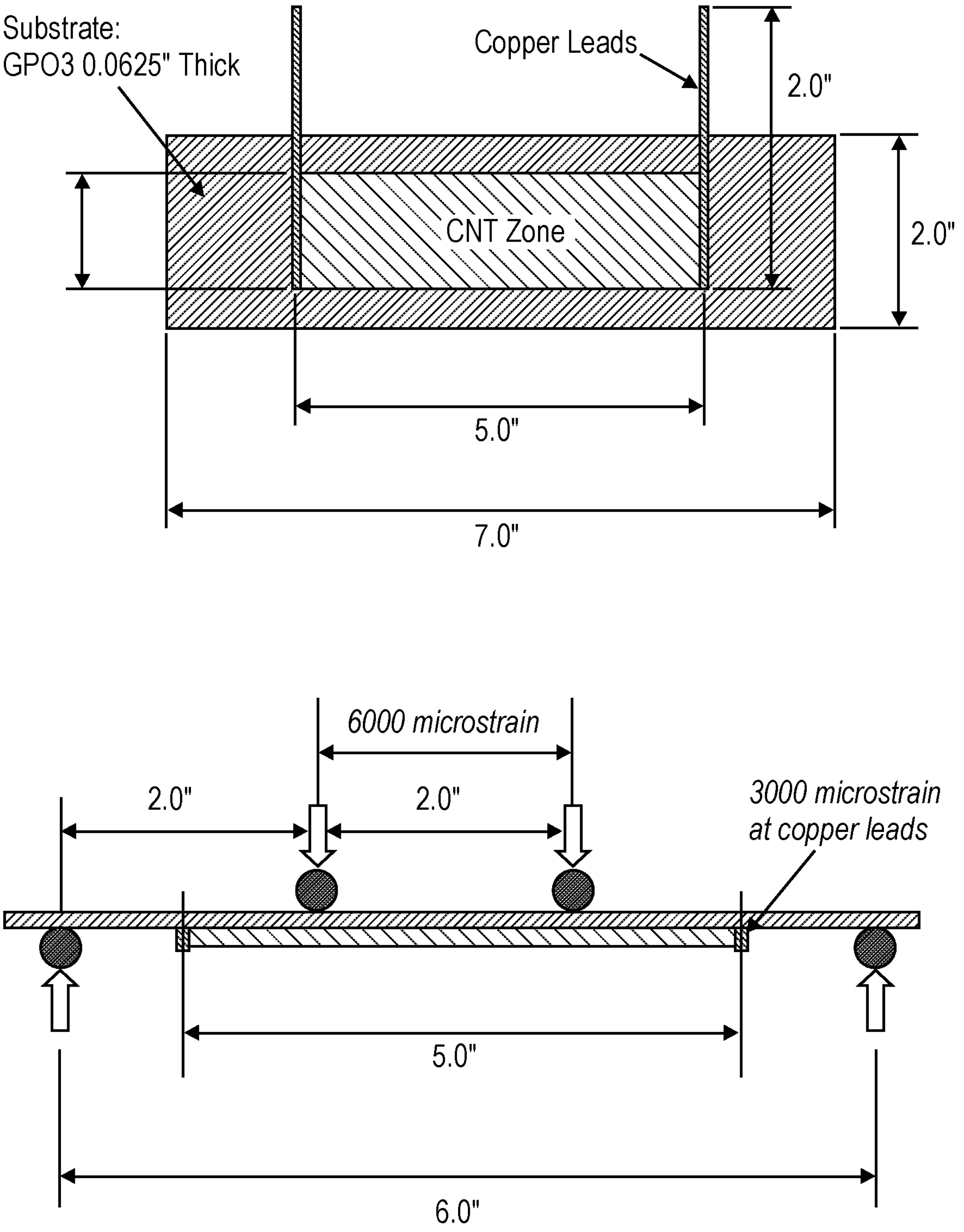
FIG. 5 shows the configuration used for flexural testing. Dimensions are shown in inches.

A sample was prepared by first applying a primer (PPG primer 44GN072, low density epoxy primer) coating to a fiberglass (prepreg) substrate followed by applying a CNT network film via a dispersion, drying, applying a second primer coating (PPG primer 02Y04 chromium primer, low density epoxy primer), and sandwiching with a second fiberglass substrate. The primer layers were relatively thin compared to other layers. Copper braids provided electrical connections to the CNT layer. The laminate was bonded by hot pressing. The flexural stability of the laminate was tested in a four-point bend test using ASTM D6272 Procedure A at a strain rate of 0.5 inch/min flex to 6000 microstrain. The design of the test is shown in the FIG. 5. The samples had similar thermal uniformity and same resistivity (within 5%) before and after the 4 point bend test.

What is claimed:

1. A heater comprising, in sequence, a first substrate, an adhesive layer, a layer comprising a sulfonated tetrafluoroethylene based fluoropolymer-copolymer, a CNT network layer, and a cover layer comprising a protective coating and/or a second substrate; and further comprising a conductor electrically connected to the CNT network layer so that a current can be passed through the CNT layer during operation.

2. The heater of claim 1 wherein the cover layer comprises the second substrate.

3. The heater of claim 1 wherein the first substrate and the heater are transparent.

4. The heater of claim 1 wherein the adhesive layer comprises PVB.

5. The heater of claim 1 wherein the conductor comprises a copper braid.

6. The heater of claim 2 wherein the first and second substrates each comprise at least one layer comprising borosilicate glass.

7. The heater of claim 1 having stability such that upon exposure to ambient conditions for 14 days, there is a 10% or less increase in electrical resistance.

8. The heater of claim 2 wherein the CNT network layer comprises a length of at least 12 cm disposed between two electrical leads; wherein the heater has flexibility and stability such that, upon being subjected to a strain of 6000 microstrain via a four-point bend test according to ASTM D6272A at a strain rate of 0.5 in/min, and released to no strain, there is less than a 5% change in electrical resistance.

9. The heater of claim 8 wherein, if upon being subjected to ASTM D6272A, there is a 10% or less change in resistivity at a deflection of 0.75 inches.

10. The heater of claim 8 wherein the first and second substrates comprise fiberglass.

11. The heater of claim 1 wherein, upon being subjected to a strain of 6000 microstrain via a four-point bend test according to ASTM D6272A at a strain rate of 0.5 in/min, and released to no strain, there is less than a 10% change in average optical transmittance over the surface of the heater that has the underlying CNT layer.

12. The heater of claim 8 wherein upon being subjected to ASTM D6272A, there is a 5% or less change in resistivity at a deflection of 0.75 inches.

13. The heater of claim 1 wherein the CNT layer comprises a p-dopant.

14. The heater of claim 13 wherein the p-dopant contain electron accepting groups as pendant groups on a backbone.

15. The heater of claim 13 wherein the CNT layer comprises at least 50 wt % CNTs.

* * * * *